(12) United States Patent
Bindschedler et al.

(10) Patent No.: US 7,906,204 B2
(45) Date of Patent: Mar. 15, 2011

(54) WATERPROOFING UV-RESISTANT BITUMINOUS MEMBRANE, SYSTEM INCORPORATING SUCH A MEMBRANE, AND MANUFACTURING PROCESS

(75) Inventors: Pierre Etienne Bindschedler, Obernai (FR); Christine Robach, Durningen (FR); Remi Perrin, Bischoffsheim (FR)

(73) Assignee: Soprema, Strasbourg (FR)

( * ) Notice: Subject to any disclaimer, the term of this patent is extended or adjusted under 35 U.S.C. 154(b) by 852 days.

(21) Appl. No.: 11/724,602

(22) Filed: Mar. 15, 2007

(65) Prior Publication Data
US 2007/0218268 A1  Sep. 20, 2007

(30) Foreign Application Priority Data

Mar. 16, 2006  (FR) ..................... 06 50907

(51) Int. Cl.
B32B 7/02 (2006.01)
B32B 17/02 (2006.01)
B32B 5/02 (2006.01)
B32B 27/04 (2006.01)
D04H 1/00 (2006.01)
D03D 9/00 (2006.01)

(52) U.S. Cl. ......... 428/292.1; 428/212; 442/20; 442/29; 442/43; 442/44; 442/46; 442/48; 442/49; 442/59

(58) Field of Classification Search ............ 442/20, 442/29, 42, 43, 44, 46, 48, 49
See application file for complete search history.

(56) References Cited

U.S. PATENT DOCUMENTS

| 2005/0144868 A1 | 7/2005 | Koschitzky | |
|---|---|---|---|
| 2005/0250399 A1* | 11/2005 | Kuhn et al. | 442/48 |
| 2006/0110996 A1* | 5/2006 | Getlichermann et al. | 442/59 |

FOREIGN PATENT DOCUMENTS

| DE | 87 05 654 U1 | 8/1988 |
| DE | 198 22 876 A1 | 12/1999 |
| DE | 199 42 878 A1 | 3/2001 |
| DE | 19942878 A1 | 3/2001 |
| EP | 0271727 B1 | 10/1989 |
| EP | 0905303 A2 | 3/1999 |
| EP | 1063083 A2 | 12/2000 |

OTHER PUBLICATIONS

INPI Report, Nov. 27, 2006 (1 pg).
"BauderTOP TS 40 NSK—die naht-selbstklebende Schalungsbanh," BAUDER, received at the EPO on Jun. 15, 2010, 5 pages.

* cited by examiner

Primary Examiner — D. Lawrence Tarazano
Assistant Examiner — Camie S Thompson
(74) Attorney, Agent, or Firm — Toler Law Group, IP

(57) ABSTRACT

A waterproofing UV-resistant bituminous membrane, a system incorporating such a membrane, and a manufacturing process are disclosed. In a particular embodiment, a UV-resistant waterproofing membrane includes a mass of at least one bituminous composition, formed in at least one continuous layer, and of at least one ply of filamentous or fibrous material, embedded in the mass. The membrane is characterized in that the at least present bituminous composition consists of a bituminous mixture based principally on bitumen, SBS elastomeric polymer and mineral fillers and in that said at least one ply (3) consists of a fine web, of open-work structure, with no preferred direction of stress resistance and formed of filaments and/or fibers in a material that is preferably resistant to UV, said web (3) being embedded in the mass (2) of bituminous composition(s) while being situated next to the face (4) designed to be visible or exposed, after laying said membrane (1).

21 Claims, 1 Drawing Sheet

WATERPROOFING UV-RESISTANT BITUMINOUS MEMBRANE, SYSTEM INCORPORATING SUCH A MEMBRANE, AND MANUFACTURING PROCESS

CLAIM OF PRIORITY

The present application claims priority from French Patent Application No. 06 50907, filed Mar. 16, 2006, the content of which is expressly incorporated herein by reference in its entirety.

FIELD OF THE DISCLOSURE

The present disclosure relates to the field of waterproofing and insulation products, more particularly products in the form of pliable, flexible bituminous membranes or sheets, with fibrous or filamentous reinforcement intended to be exposed to attack, of the climatic, atmospheric and solar type (humidity, temperature variation, UV, etc.), from the outside environment.

BACKGROUND

Since they were first implemented, that is, since about the end of the 19th century, products of the aforementioned type have undergone various modifications and development, particularly regarding the bituminous binding mass impregnating or coating the core.

Thus, this binding mass consisted initially of oxidized bitumen. Then from the 1960-1970s onwards, the binding mass consisted of a mixture [bitumen+atactic polypropylene (APP)] and since about 1975 binding masses based on mixtures [bitumen+SBS polymer (styrene-butadiene-styrene)] have become widespread.

However, atactic polypropylenes are not particularly compatible with bitumen, are not always easily available in large quantities and have a particular behavior when hot (with a high melting point) associated with a sharp reduction in viscosity. The strength of the seams of this type of membrane remains to this day a technical problem that is not completely solved.

As for SBS elastomeric polymers, these have numerous advantageous properties, namely high elasticity, great durability, good workability and high availability in terms of resources.

Nevertheless, these substances have a major drawback in the context of applications of the aforementioned products: they are sensitive to UV (ultraviolet). In fact, butadiene has unsaturated double carbon/carbon bonds which are susceptible to UV.

Under the combined effect of UV, temperature variations and humidity, waterproofing membranes based on a bitumen/SBS binder subjected to atmospheric or climatic agents therefore rapidly show microcrazing, in the absence of a special surface protection layer, which damages the aesthetic appearance and continued waterproofing qualities of said membranes.

To overcome this drawback, waterproofing membranes based on a bitumen/SBS binder are at present, in a known manner, covered with a layer of flakes (mineral, organic or metallic) or with a metallic laminate, which are incorporated during manufacture in the surface of said membranes. Membranes based on SBS-modified bitumen that do not have such auto-protection must at present be protected from UV on site by a removable protection (surfacing, revegetation, fine gravel, etc.).

This added protection, known as auto-protection, generates significant extra weight (generally of approximately 1 kg/m2), produces a free fraction which may block the rainwater disposal means and prevent the production of sealed jointing by partial overlap of adjacent membranes (the flakes must be removed along the longitudinal edges and in the region of the end transversal zones of said membranes).

The problem posed for the present invention therefore consists of providing a bituminous waterproofing membrane based on a bitumen/elastomer binder, that has in particular good UV resistance without specific auto-protection, good workability and good performance over time, from the point of view of both waterproofing and visual appearance, while advantageously allowing laying with partial lateral overlap and positive connection by heating.

The invention will be better understood with the help of the description below, which relates to preferred embodiments, given as non-limiting examples, and explained with reference to the accompanying drawings, in which:

DETAILED DESCRIPTION OF THE DRAWINGS

Accordingly, the present invention relates to a waterproofing membrane designed to be exposed directly to the outside environment and to attack thereby, this membrane consisting basically of a mass of at least one bituminous composition, formed in at least one continuous layer, and at least one ply of filamentous or fibrous material, embedded in said mass, a membrane characterized in that the at least present bituminous composition consists of a bituminous mixture based principally on bitumen, SBS elastomeric polymer and filler(s), preferably mineral, in that said at least one ply consists of a fine web, of open-work structure, with no preferred direction of stress resistance and formed of filaments and/or fibers of a material preferably resistant to UV, said web being embedded in the mass of bituminous composition(s) while being situated next to the face intended to be visible or exposed, after laying of said membrane and in that said membrane comprises a lateral band, along one of its longitudinal sides, forming an overlap edging, said edging having no ply or web.

The presence of this web must not however compromise the good performance of the adjoining seams when applying the membranes on site. The web thus embedded resists the formation and propagation of surface cracks and crazing of the underlying coating mass while providing an aesthetic appearance.

Figure 1:
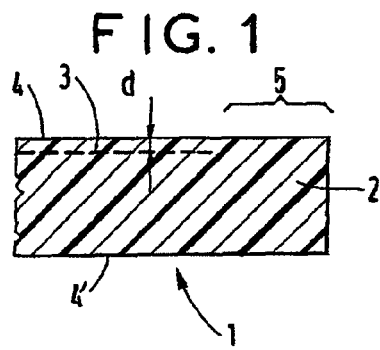
FIG. 1 is a partial diagrammatic view in cross-section of a waterproofing membrane according to a first embodiment of the invention.
Figure 2:
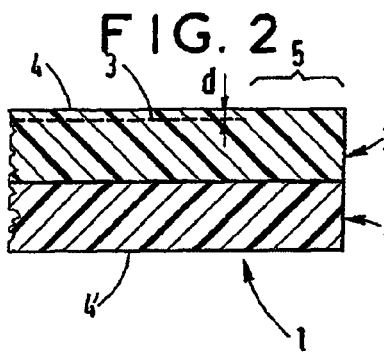
FIG. 2 is a partial diagrammatic view in cross-section of a waterproofing membrane according to a second embodiment of the invention.
Figure 3:
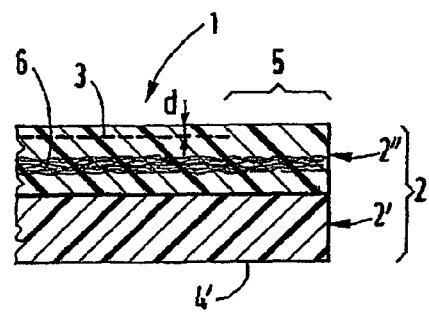
FIG. 3 is a partial diagrammatic view in cross-section of a waterproofing membrane according to a third embodiment of the invention.

FIGS. 1 to 3 of the accompanying drawings illustrate diagrammatically and in partial section, a waterproofing membrane 1 consisting basically of a mass 2 of at least one bituminous composition, formed in at least one continuous layer, and of at least one ply 3, 6 of filamentous or fibrous material, embedded in said mass 2.

According to an embodiment of the invention, the at least present bituminous composition consists of a bituminous mixture based principally on bitumen, SBS elastomeric polymer and filler(s), preferably mineral, and said at least one ply 3 consists of a fine web, of open-work structure, with no preferred direction of stress resistance and formed of filaments and/or fibers of a material preferably resistant to UV, said web 3 being embedded in the mass 2 of bituminous composition(s) while being situated next to the face 4 intended to be visible or exposed, after laying of said membrane 1.

The web 3, by providing structural and mechanical cohesion for the mass 2 of bituminous binder next to the surface of the face 4 of the membrane 1, even on a very small scale, allows the formation of surface microcrazing to be avoided, without the need for an additional protective layer and without significantly increasing the weight or rigidity of the membrane 1 that incorporates it, and without substantially increasing the manufacturing cost thereof.

Also according to an embodiment of the invention, and to allow a continuous sealed surface layer to be formed over their entire surface by adjacent association with partial overlap of a plurality of membranes 1, each membrane 1 comprises a lateral band 5, along one of its longitudinal sides, forming an overlap edging, said edging 5 having no ply or web 3. The absence of web 3 in this zone avoids buckling of the membrane 1 in this region (during the softening operation by application of heat), the formation of stresses in this zone and the separation of the web 3 in the heated zone when welding the membrane.

As shown in FIG. 1 of the accompanying drawings, the mass 2 of bituminous binder may consist entirely of only one composition in the form of a mixture of bitumen+SBS elastomeric polymer+optional mineral filler(s) and/or additives (fire-resistant, root-resistant, etc.).

In a variant, and as illustrated in FIGS. 2 and 3 of the accompanying drawings, the mass of bituminous compositions may comprise at least two different compositions distributed in at least two adjacent, stratified layers 2', 2", namely at least a first layer 2' forming the non-visible or non-exposed face 4' of the membrane 1 after laying and consisting of a bituminous mixture based on bitumen, SBS elastomeric polymer and filler(s) and at least a second layer 2" forming the visible and exposed face 4 of the membrane 1 after laying and consisting of a bituminous mixture compatible with that of the first layer 2' and based on bitumen mixed with an elastomeric polymer having increased resistance, or even insensitivity, to UV rays, and optionally with a filler or fillers, preferably mineral.

Preferably, the bituminous composition of said at least one second layer 2" forming the visible and exposed face 4 of the membrane 1 consists basically of bitumen mixed with an SEBS elastomeric polymer and optionally with a filler or fillers, preferably mineral.

A person skilled in the art will of course understand that the aforementioned bituminous mixtures also comprise, in addition to the components indicated above (bitumen, SBS, SEBS), the fillers and additives conventionally incorporated in these types of composition and well known to a person skilled in the art. The additives may optionally comprise substances that are UV-resistant, compatibalising or that improve flexibility, durability or resistance to temperature variations.

According to the second variant referred to above, provision is advantageously made for the fine web 3 forming said at least one ply, for example of the type with a non-woven, wired, woven or similar structure, to be embedded in said at least one second layer 2", while being arranged immediately next to the visible or exposed face 4 of the membrane 1.

Advantageously, the mid-plane of said web 3 is situated, in the aforementioned two variants, at a distance d of between 0.05 mm and 0.5 mm, preferably between 0.1 mm and 0.25 mm, of said face 4. The filaments or fibers forming the web 3 may be produced for example in glass, polypropylene, polyamide, polyester or similar polymer or mineral materials.

Figure 4:
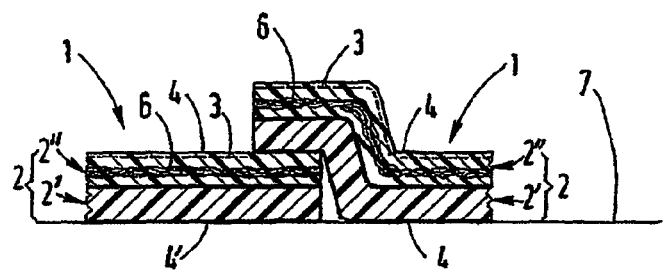
FIG. 4 is a view in cross-section of a lateral jointing zone between two membranes of the type illustrated in FIG. 3.
Figure 5:
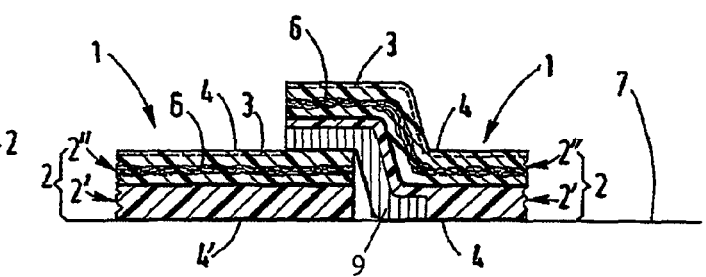
FIG. 5 is a similar view to FIG. 4 relating to a variant embodiment of the membrane of FIG. 3, and, FIG. 6 is a partial phantom view from above of the surface layer of a waterproofing system, formed by waterproofing membranes according to embodiments of the invention.

According to a preferred embodiment of the invention, illustrated in FIGS. 3, 4 and 5 of the accompanying drawings, the membrane 1 comprises a second ply 6 of filamentous or fibrous material, also embedded in the mass 2 of bituminous composition(s) and forming a reinforcement framework extending, widthways and lengthways, over the entire surface of the membrane 1, the fine web 3 forming a first ply being arranged between said second ply 6 and the visible or exposed face 4 of the membrane 1 after laying (apart from the overlap edging 5).

As part of the preferred embodiment referred to above, provision may be made for the mass 2 of bituminous compositions to comprise two bituminous mixtures distributed in two stratified layers 2' and 2", the second ply 6 forming a reinforcement framework being either situated and embedded in the second layer 2" forming the visible or exposed face 4 of the membrane 1 after laying, or situated substantially at the interface of the two layers 2' and 2" being impregnated at the same time by the bituminous composition of the first layer 2' and that of the second layer 2".

To increase the structural coherence of the membrane 1, and in particular to prevent delamination thereof, the two plies 3 and 6 may be connected, at least partially, to each other by chemical and/or mechanical connection points.

As shown in FIG. 5 of the accompanying drawings, provision may also be made for the membrane 1 to comprise, in the region of a zone in the form of a band or lateral band portion of its lower face, a band or band portion 9 in a bitumen or bituminous composition different from the bitumen or bituminous composition forming the bituminous mass 2 of the membrane 1 or the first layer 2' defining the lower non-visible and non-exposed face 4 of the membrane 1, said band or band portion 9 extending preferably along the longitudinal side of the membrane 1 opposite the side comprising the edging 5 and being arranged in the region of a clearance in the form of a band or band portion of substantially complementary volume arranged in said mass 2 or layer 2'.

Such a band 9 may, for example, consist of a band such as the one referred to in U.S. Pat. No. 6,740,356 and in the European Patent Application No. 1,201,819, and may be produced using the operating technique described and illustrated in these two applications.

The band 9 consists advantageously of a bituminous composition that promotes adhesion, waterproofing and/or flexibility along the side concerned.

Figure 6:
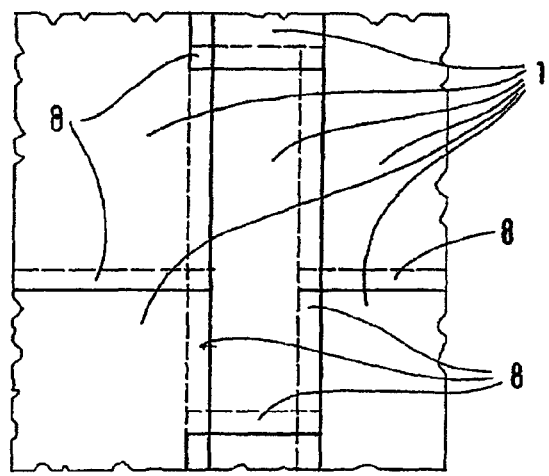

The present invention also relates, as shown diagrammatically in FIGS. 4, 5 and 6 of the accompanying drawings, to a waterproofing system added onto a support exposed to atmospheric and climatic agents, preferably with a substantially planar surface, in particular a roof or similar covering element, a system characterized in that it comprises an external component or exposed surface layer which is formed by one or a plurality of membranes 1 as described above, the membranes 1 optionally present (in the case of a plurality of membranes) partially overlapping in the region of their longitudinal sides and/or in the region of their longitudinal ends, forming sealed connection zones 8.

The visible or exposed face 4 of the waterproofing membrane(s) 1 forming the surface layer may be covered with a film of a decorative, and, if necessary, protective material, such as paint for example.

Finally, the invention also relates to a manufacturing process for a membrane 1 as described above, characterized in that it consists of impregnating a band of a ply of filamentous or fibrous material 6 with a mass 2, 2" of a bituminous mixture in liquid state, incorporating basically bitumen, an SBS or SEBS elastomeric polymer and at least one filler, by pulling said band through impregnation equipment, of putting in place a band of fine web 3 on the surface of the mass of the bituminous mixture 2, 2" impregnating and coating the band of ply 6 while this mass of binder is still in the viscous state, in such a way that said web 3 is embedded in said mass of bituminous mixture 2, 2" while being situated next to the visible or exposed face of the resulting membrane 1, said web 3 being narrower than the ply 6 so as to form a lateral band 5 along one longitudinal side, forming an overlap edging with no web 3, which may have an additional layer 2' of a bituminous mixture [bitumen/SBS elastomeric polymer/optionally mineral filler(s)] on the face opposite the visible or exposed face 4 of the membrane 1, and, finally, of rolling said membrane 1 after cooling and cutting lengthways and widthways.

If a band 9 of a different bituminous composition is envisaged, the aforementioned process will be added to or modified to include the operational steps required to form this band 9, as described and illustrated in the aforementioned American and European patent applications.

Non-limiting examples of several practical embodiments of membranes according to the invention will now be described.

Example 1

Waterproofing membrane 2.5 mm thick and 1000 mm wide with 50 g/m2 glass web reinforcement. The binder is a 160/220 bitumen mixture modified by 12.5% KRATON TR 1186-type radial SBS (percentage of SBS based on the bitumen+SBS mixture), this mixture having up to 30% filler. In this binder is embedded a 35 g/m2 viscous web 920 mm wide so as to have an 80 mm weldable edging. The under-face is protected by a PE film 10 □m thick.

Example 2

Single-layer waterproofing membrane 4.0 mm thick and 1000 mm wide with 180 g/m2 reinforcement of non-woven polyester. The binder is a 160/220 bitumen mixture modified by 12.5% of a 50/50 mixture of KRATON TR 1186-type radial SBS and KRATON G 1650-type SES. In this binder is embedded a 25 g/m2 polyester web 920 mm wide so as to have an 80 mm weldable edging. The under-face is protected by a 10 μm thick PE film.

Example 3

Single-layer waterproofing membrane 4.0 mm thick and 1000 mm wide with composite 250 g/m2 reinforcement. The surface binder is a 160/220 bitumen mixture modified by 12.5% of a 50/50 mixture of KRATON TR 1186-type radial SBS and KRATON G 1650-type SEBS. In this binder is embedded a 50 g/m2 web of glass 920 mm wide so as to have an 80 mm weldable edging. The under-face binder is a 160/220 bitumen mixture modified by 12.5% KRATON TR 1186-type radial SBS. The under-face is protected by a PE film 10 □m thick.

In an embodiment, a waterproofing UV-resistant bituminous membrane, system incorporating such a membrane and manufacturing process are disclosed.

In an embodiment, a UV-resistant waterproofing membrane disclosed consisting basically of a mass of at least one bituminous composition, formed in at least one continuous layer, and of at least one ply of filamentous or fibrous material, embedded in said mass.

In an embodiment, a membrane may be characterized in that the at least present bituminous composition consists of a bituminous mixture based principally on bitumen, SBS elastomeric polymer and mineral fillers and in that said at least one ply (3) consists of a fine web, of open-work structure, with no preferred direction of stress resistance and formed of filaments and/or fibers in a material that is preferably resistant to UV, said web (3) being embedded in the mass (2) of bituminous composition(s) while being situated next to the face (4) designed to be visible or exposed, after laying said membrane (1).

Of course, the invention is not limited to the embodiments described and illustrated in the accompanying drawings. Modifications are possible, particularly from the point of view of the structure of the various elements or by substitution of technical equivalents, without thereby departing from the scope of protection of the invention.

What is claimed is:

1. A waterproofing membrane comprising:
 a mass of at least one bituminous composition, wherein the mass of at least one bituminous composition is formed in at least one continuous layer and includes at least one ply of at least one of filamentous material and fibrous material, wherein the at least one ply is embedded in said mass;
 wherein the at least one bituminous composition includes a bituminous mixture consisting essentially of bitumen, SBS elastomeric polymer and at least one filler;
 wherein the at least one ply includes a fine web, of open-work structure, with no preferred direction of stress resistance and formed of at least one of filaments and fibres of a material;
 wherein the fine web is embedded in the mass proximate to a first face of the membrane to be visible or exposed to the environment; and
 wherein the membrane comprises a lateral band along at least one of a plurality of longitudinal sides of the membrane to form an overlap edging to facilitate connection to a second lateral band of a second waterproofing member after the application of heat to the lateral band, said edging having no ply or web.

2. The waterproofing membrane of claim 1, wherein the at least one filler includes a mineral filler.

3. The waterproofing membrane of claim 1, wherein the fine web is formed of at least one of filaments and fibres of a material that is resistant to ultraviolet (UV) rays.

4. The waterproofing membrane of claim 1, wherein the first face is at least one of visible and exposed after laying of said waterproofing membrane.

5. The waterproofing membrane of claim 1, wherein the mass of at least one bituminous composition comprises at least two different compositions distributed in at least two adjacent, stratified layers, the mass of at least one bituminous composition including at least one first layer forming a second face of the membrane that is to be non-visible or non-exposed to the environment and comprising a bituminous mixture that includes bitumen, SBS elastomeric polymer and at least one filler, the mass of at least one bituminous composition further including at least one second layer forming the first face of the membrane and comprising a bituminous mixture that is compatible with the bituminous mixture of the at least one first layer and that includes bitumen mixed with an elastomeric polymer having increased resistance or insensitivity to UV rays.

6. The waterproofing membrane of claim 5, wherein the at least one second layer further comprises at least one filler.

7. The waterproofing membrane of claim 5, wherein the at least one second layer further comprises at least one mineral filler.

8. The waterproofing membrane of claim 5, wherein the bituminous mixture of said at least one second layer forming the first face consists essentially of bitumen mixed with an SEBS elastomeric polymer.

9. The waterproofing membrane of claim 5, wherein the fine web of said at least one ply is embedded in said at least one second layer and is arranged immediately next to the first face of the membrane, wherein a mid-plane of said fine web is situated at a distance of between substantially 0.05 mm and substantially 0.5 mm from said first face.

10. The waterproofing membrane of claim 9, wherein the fine web of said at least one ply has at least one of a non-woven structure, a wired structure, and a woven or similar structure.

11. The waterproofing membrane of claim 9, wherein the distance from said first face is between substantially 0.1 mm and substantially 0.25 mm.

12. The waterproofing membrane of claim 5, further comprising a second ply of filamentous material or fibrous material embedded in the mass of at least one bituminous composition and forming a reinforcement framework extending, widthways and lengthways, over an entire surface of the membrane, and wherein the fine web is arranged between said second ply and the first face of the membrane.

13. The waterproofing membrane of claim 12, wherein the mass of at least one bituminous composition comprises two bituminous mixtures distributed in two stratified layers, the second ply forming the reinforcement framework being either embedded in the at least one second layer forming the first face of the membrane or situated substantially at an interface of the at least one first layer and the at least one second layer and impregnated by the bituminous mixture of the at least one first layer and the bituminous mixture of the at least one second layer.

14. The waterproofing membrane of claim 12, wherein the first ply and the second ply are connected, at least partially, by chemical or mechanical connection points, or any combination thereof.

15. The waterproofing membrane of claim 1, further comprising, in a region of a zone in a form of a band or lateral band portion of a lower face of the membrane, a band or band portion having a bitumen or bituminous composition that is different from a bitumen or bituminous composition of the mass of at least one bituminous composition or of the at least one first layer forming a second face of the membrane, said band or band portion extending along a longitudinal side of the membrane that is opposite the at least one of the plurality of longitudinal sides comprising the overlap edging, and said band or band portion being arranged in the region of a clearance in the form of a band or band portion of substantially complementary volume arranged in said mass of at least one bituminous composition or the at least one first layer.

16. A waterproofing system added onto a support exposed to atmospheric and climatic agents, comprising an external component or exposed surface layer which is formed by at least one of a plurality of membranes according to any one of claims 1, 5, 8, 9, 12, 13, 14, and 15, and wherein at least two membranes of the plurality of membranes at least partially overlap in a region of their longitudinal sides to form at least one sealed connection zone.

17. The system of claim 16, wherein the first face is covered with one of a film of a decorative material, a film of a decorative and protective material, and paint.

18. The waterproofing membrane of claim 1, wherein the fine web inhibits microcrazing of the mass proximate to the first face of the membrane.

19. A process to manufacture a membrane, the process comprising:
    impregnating a band of a ply of filamentous material or fibrous material with a mass of a bituminous mixture in liquid state, the mass of bituminous mixture incorporating bitumen, an SBS or SEBS elastomeric polymer and at least one filler, by pulling said band through impregnation equipment;
    putting in place a band of fine web on a surface of the mass of bituminous mixture impregnating and coating the band of ply while the mass of the bituminous mixture is in a viscous state, in such a way that said fine web is embedded in said mass of the bituminous mixture while being situated next to a visible or exposed face of a resulting membrane, said fine web being narrower than the ply to form a lateral band along a longitudinal side of the membrane, forming an overlap edging with no web to facilitate welding the membrane to a second overlap edging of a second membrane after application of heat to soften the overlap edging;
    rolling said membrane after cooling; and
    cutting said membrane lengthways and widthways.

20. The process of claim 19, wherein the lateral band has an additional layer of a bituminous mixture that includes bitumen and SBS elastomeric polymer on a face opposite the visible or exposed face of the membrane.

21. The process of claim 20, wherein the additional layer of the bituminous mixture further includes at least one mineral filler.

* * * * *